US012801541B2

(12) United States Patent
Ke et al.

(10) Patent No.: US 12,801,541 B2
(45) Date of Patent: Nov. 17, 2026

(54) METHOD OF DYNAMIC CHANNEL SWITCH BY HYPERVISOR

(71) Applicant: MEDIATEK INC., Hsin-Chu (TW)

(72) Inventors: Jun-Yi Ke, Hsinchu City (TW); Jia-An Wang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 605 days.

(21) Appl. No.: 18/234,387

(22) Filed: Aug. 16, 2023

(65) Prior Publication Data

US 2025/0060983 A1 Feb. 20, 2025

(51) Int. Cl.

*G06F 13/16* (2006.01)
*G06F 3/06* (2006.01)
*G06F 9/455* (2018.01)

(52) U.S. Cl.

CPC ............ *G06F 13/16* (2013.01); *G06F 3/0625* (2013.01); *G06F 3/0634* (2013.01); *G06F 3/0647* (2013.01); *G06F 3/0673* (2013.01); *G06F 9/45558* (2013.01); *G06F 13/1694* (2013.01); *G06F 2009/45583* (2013.01)

(58) Field of Classification Search

CPC ...... G06F 13/16; G06F 3/0625; G06F 3/0634; G06F 3/0647; G06F 3/0673; G06F 9/45558; G06F 13/1694; G06F 2009/454583

See application file for complete search history.

(56) References Cited

U.S. PATENT DOCUMENTS 10,409,744 B1 * 9/2019 Gross .................... G06F 1/3287
2011/0197004 A1 8/2011 Serebrin
2012/0131248 A1 5/2012 Abali
2014/0143577 A1 * 5/2014 Nachimuthu ......... G06F 3/0647 713/324
2016/0054947 A1 * 2/2016 Liu ....................... G06F 3/0634 711/170

FOREIGN PATENT DOCUMENTS

CN 113495857 A 10/2021
JP 64-8454 1/1989
WO 2013/095559 A1 6/2013

OTHER PUBLICATIONS

A microsoft defintion of a MMU that shows it is hardware, often incorporated into a CPU, that manages logical address to physical address translations. (Year: 2002).*

* cited by examiner

*Primary Examiner* — Janice M. Girouard
(74) *Attorney, Agent, or Firm* — Winston Hsu

(57) ABSTRACT

A computing system includes a memory controller, a central processing unit (CPU), and a random access memory (RAM). The memory controller determines if the computing system is in a low power mode. If the memory controller detects at least one m-channel regions of the RAM has been accessed, the memory controller sends an interrupt to a hypervisor of the CPU. Then the CPU performs page migration to move data in at least one m-channel region of the RAM to at least one n-channel region of the RAM, where m>n. After completing the page migration, the CPU notifies the memory controller.

10 Claims, 6 Drawing Sheets

METHOD OF DYNAMIC CHANNEL SWITCH BY HYPERVISOR

BACKGROUND

The architecture of dynamic random access memory (DRAM) is based on a transistor and a capacitor to form a memory cell. One memory cell stores a bit of data in the charged state of the capacitor. However, the capacitor discharges automatically, so an additional circuit must be designed to check the voltage on the capacitors frequently, and charge or discharge frequently to avoid data loss, which is called "memory update".

In today's applications, DRAM is mainly applied in personal computers, and it can also be applied in graphics cards, scanners, printers, fax machines, image compression and decompression cards, and other electronic devices. However, DRAM has high power consumption. Thus, it is an aim to reduce power consumption of the DRAM.

SUMMARY

An embodiment discloses a memory control method for a computing system. The computing system comprises a memory controller, a central processing unit (CPU), and a random access memory (RAM). The memory control method comprises the memory controller determining if the computing system is in low power mode, if the memory controller detects at least one m-channel regions of the RAM has been accessed, the memory controller sending an interrupt to a hypervisor of the CPU, the CPU performing page migration to move data in at least one m-channel region of the RAM to at least one n-channel region of the RAM, where m>n, after completing the page migration, the CPU notifying the memory controller completion of the page migration, and after the CPU notifies the memory controller completion of the page migration, the memory controller can handle the next access event and perform next page migration.

These and other objectives of the present invention will no doubt become obvious to those of ordinary skill in the art after reading the following detailed description of the preferred embodiment that is illustrated in the various figures and drawings.

DETAILED DESCRIPTION

A lot of power consumption in computing systems and devices comes from dynamic random access memories (DRAMs), and higher computation efficiency comes with higher power consumption. However, it is not always necessary to use a high performance mode for DRAM access in some scenarios. When a high efficiency is not required, a low power mode can be selected to meet the computation demand.

In some embodiments, m-channel DRAM is chosen for the high performance mode to perform high efficiency computation and an n-channel DRAM is chosen for a low power mode to save power consumption where m>n. Thus power modes can be set according to the loading of computations. For example, in a scenario requiring lower computation resources, using the m-channel DRAM would cause high power consumption while not improving the performance, thus the n-channel DRAM would be a better choice to save power. The n-channel region and m-channel region in the DRAM can be predetermined and applied by page migration from hypervisor in a central processing unit (CPU). When the low power mode is applied, the operating memory is changed from the m-channel DRAM to n-channel DRAM to save power consumption.

Figure 1A:
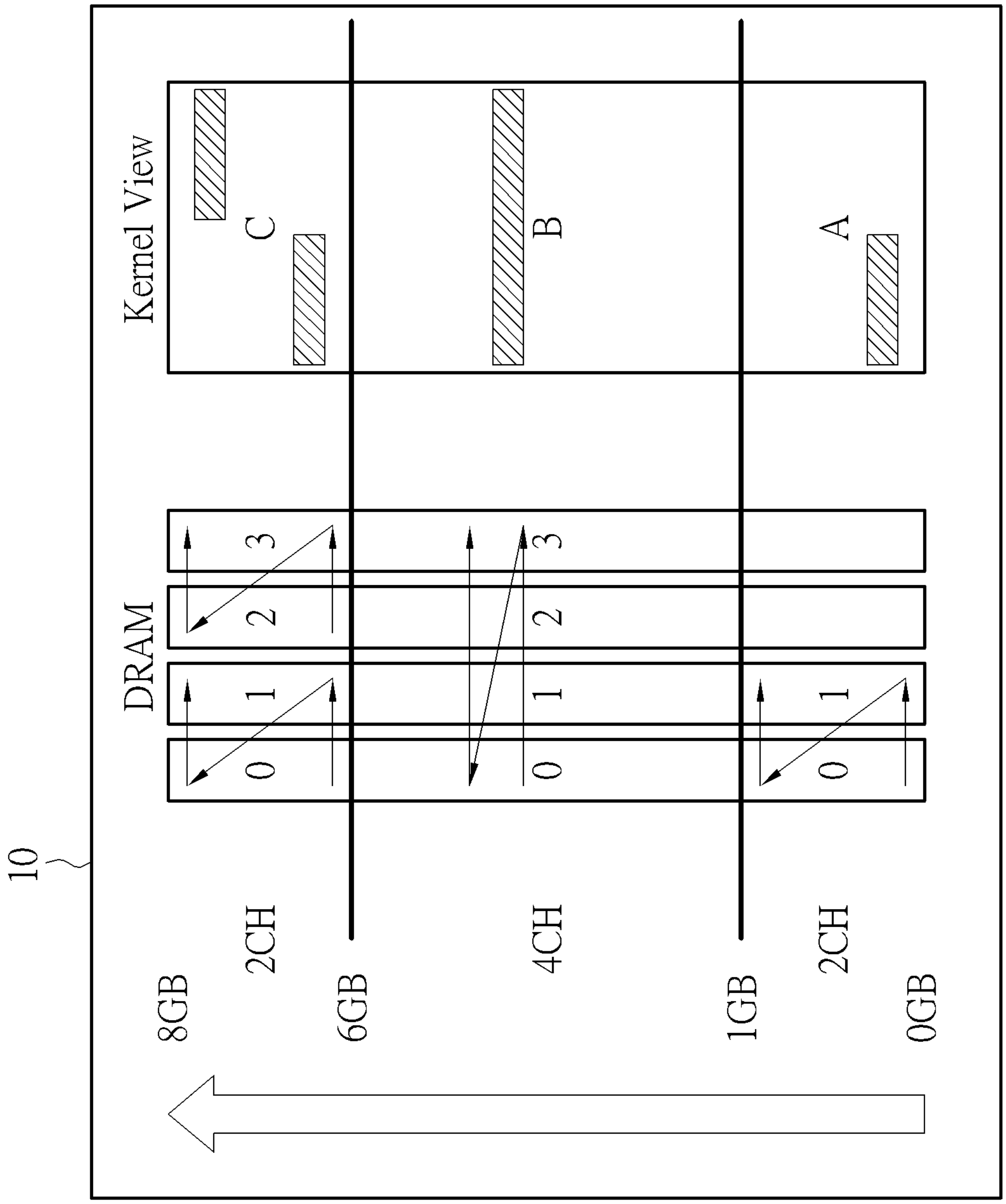
FIG. 1A shows a DRAM architecture with kernel view according to an embodiment of the present invention.

FIG. 1A shows a DRAM architecture 10 with kernel view according to an embodiment of the present invention. The 8 GB DRAM can be separated into a plurality of regions such as but not limited to 3 regions A, B, and C with memory sizes such as but not limited to 1 GB, 5 GB, and 2 GB, respectively. In these regions, A and C are set in 2-channel mode for execution in lower power mode and B is set in 4-channel mode for execution in high performance mode. When the low power mode is needed, page migration is executed to move memory of region B to region C. Each region can be set to be enabled or disabled and can be recorded with a physical address in each access. The data in a buffer is also recorded, and when the buffer is full, the interrupt is triggered to operate page migration. The way to trigger the interrupt to operate page migration is not only limited to when the buffer 25 is full but also according to other power saving conditions.

Figure 1B:
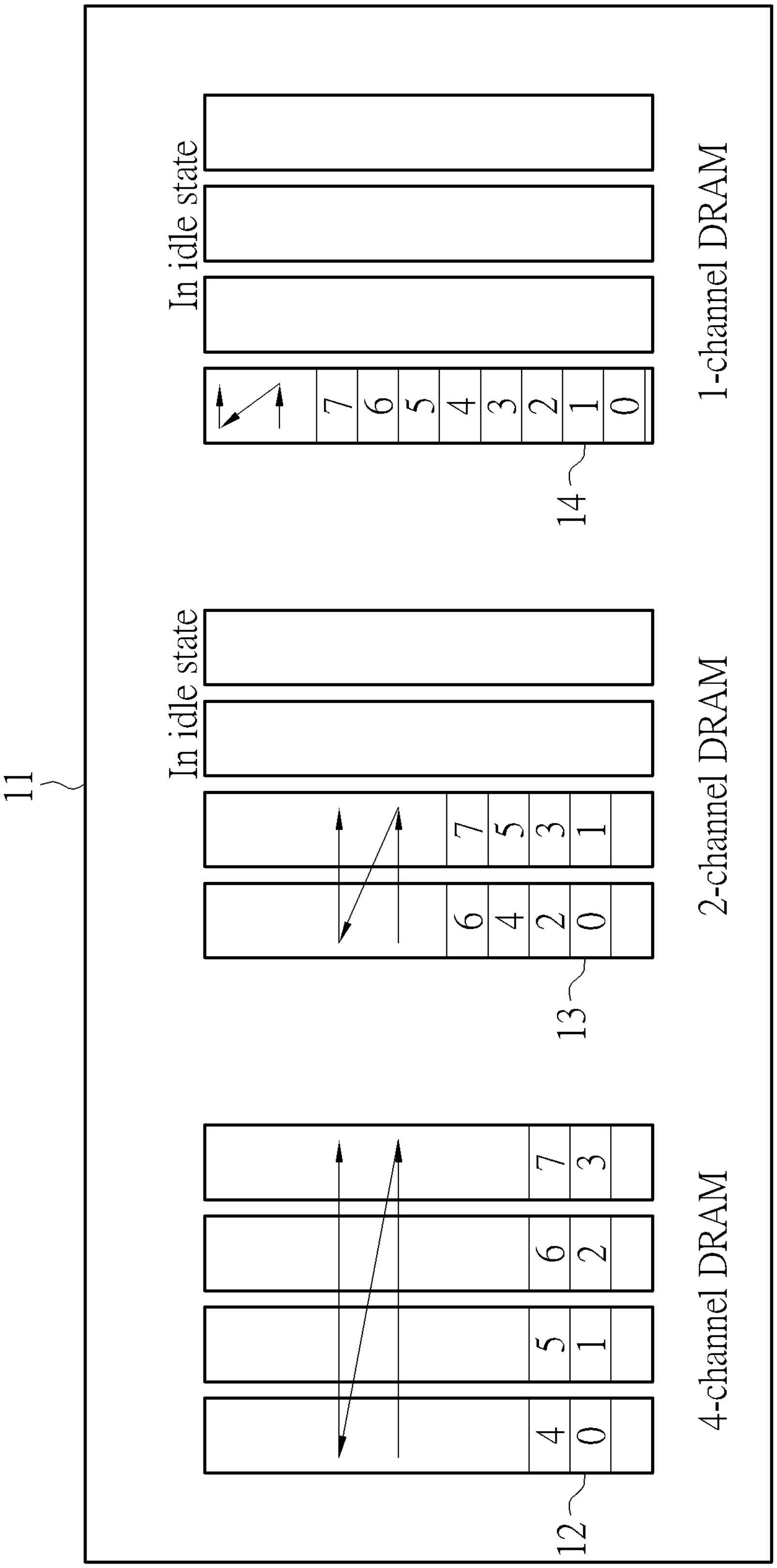
FIG. 1B shows a DRAM architecture with idle states according to an embodiment of the present invention.

FIG. 1B shows a DRAM architecture 11 with idle states according to an embodiment of the present invention. Before page migration, the 4-channel DRAM 12 works with all 4 channels to maximize the efficiency. After page migration, the 4-channel DRAM 12 changes into 2-channel DRAM 13 with 2 idle states. The bandwidth reduces to 2-channel, thus achieving low power consumption at a low speed. In another embodiment, the 4-channel DRAM 12 could change into 1-channel DRAM 14 with 3 idle states. The bandwidth of the DRAM 14 reduces to 1-channel, thus achieving even lower power consumption at an even lower speed.

Figure 2:
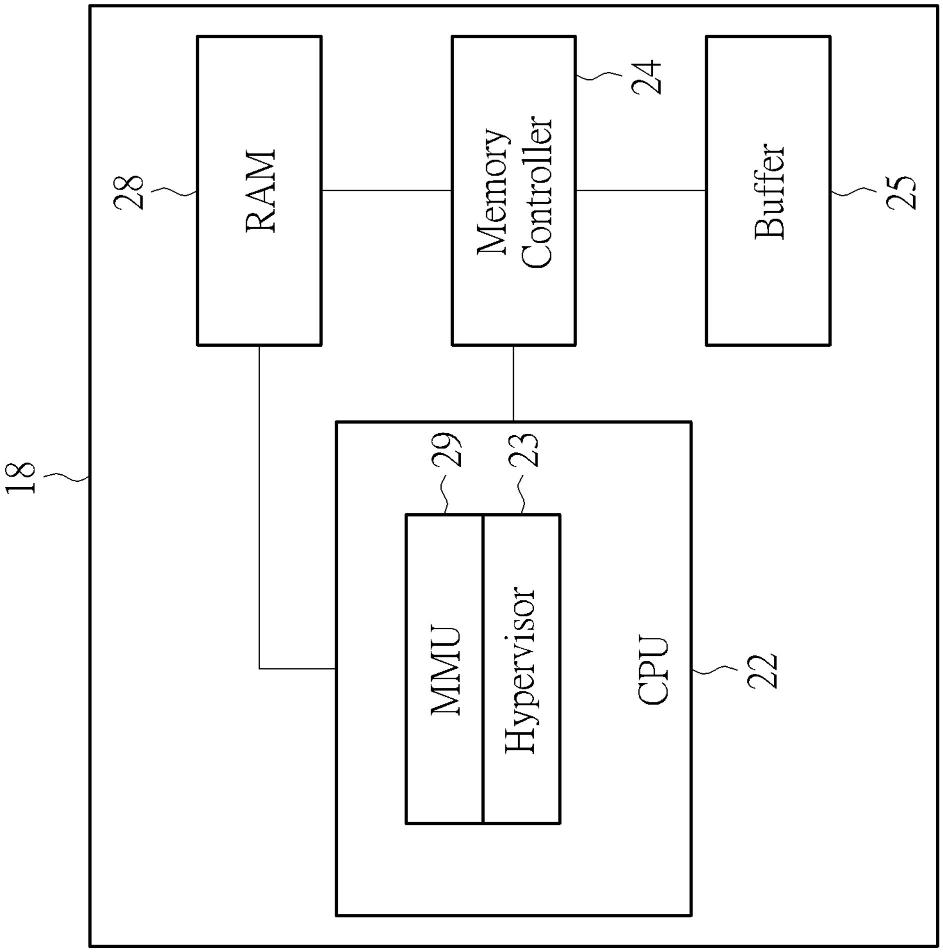
FIG. 2 is a computing system according to an embodiment of the present invention.

FIG. 2 is a computing system 18 according to an embodiment of the present invention. The computing system 18 comprises a memory controller 24, a central processing unit (CPU) 22 coupled to the memory controller 24, a random access memory (RAM) 28 coupled to the memory controller 24 and the CPU 22, and a buffer 25 coupled to the memory controller 24 for recording the access event which contains the data and the physical address of the RAM 28. The CPU 22 comprises a hypervisor 23 and a memory management unit (MMU) 29 for performing page migration.

Figure 3:
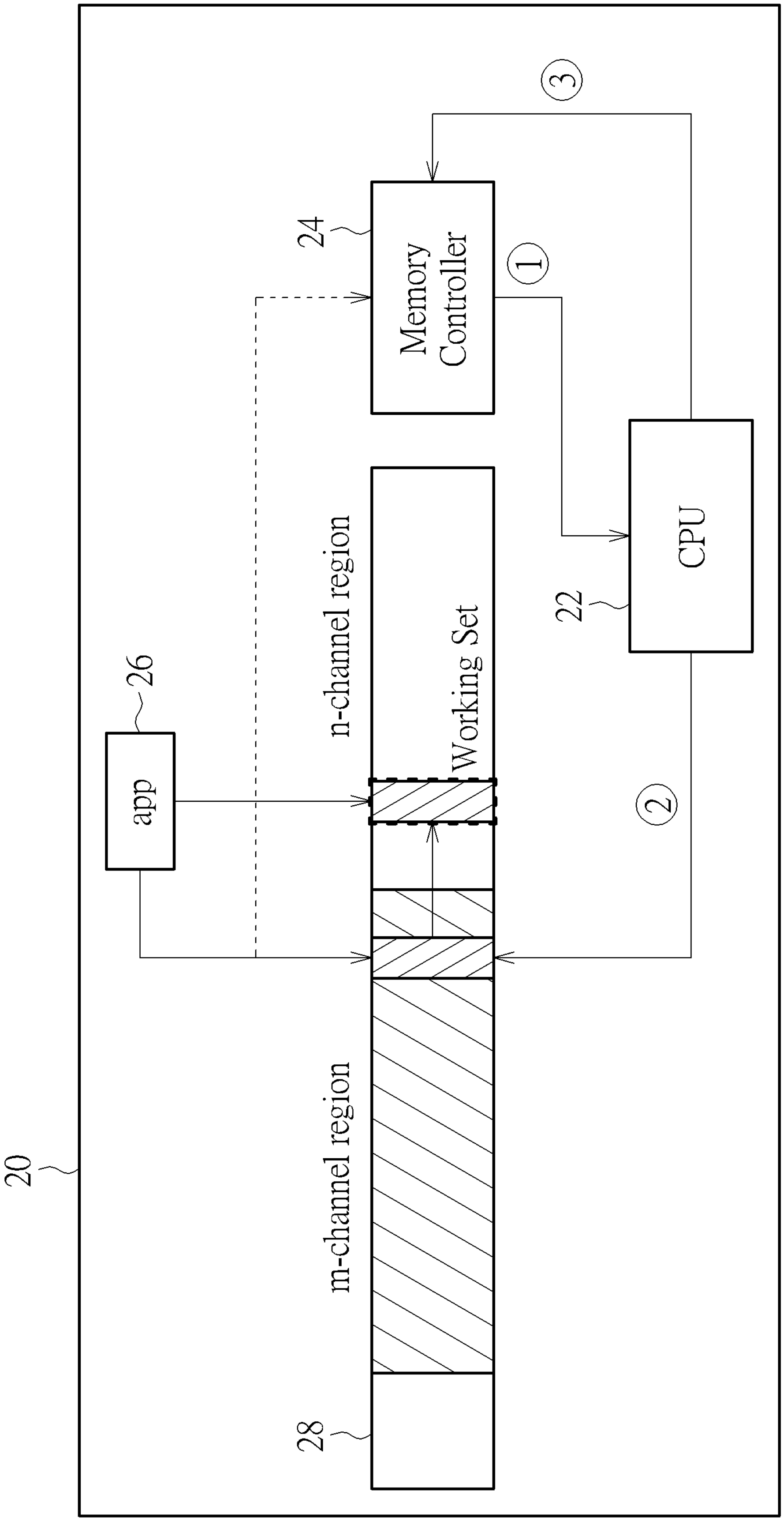
FIG. 3 is the procedure of switching modes according to an embodiment of the present invention.

FIG. 3 is a procedure 20 of switching modes according to an embodiment of the present invention. In step 1, the memory controller 24 determines if the application 26 is to be switched from a high performance mode to a low power mode. If the memory controller 24 determines that the application 26 is to be switched from the high performance mode to the low power mode and the buffer 25 is full, the memory controller 24 sends an interrupt to the hypervisor 23 of the CPU 22 in step 1. In step 2, the hypervisor 23 and MMU 29 perform page migration to move data in at least one m-channel region of the RAM 28 to at least one n-channel region of the RAM 28, where m>n. In step 3, after completing the page migration, the CPU 22 notifies the memory controller 24 completion of the page migration. After the CPU 22 notifies the memory controller 24 completion of the page migration, the memory controller 24 can handle next event of page migration. This completes the procedure 20 of switching from at least one m-channel region of the RAM 28 to at least one n-channel region of the RAM 28.

In some embodiments, the RAM 28 is dynamic random access memory (DRAM). The memory controller 24 can record access data in the buffer 25 and determine whether the access event of the application 26 is to be switched from the high performance mode to the low power mode or not when the buffer 25 is full. The way to trigger the interrupt to operate page migration is not only limited to when the buffer 25 is full but also according to other power saving conditions.

In some embodiments, after the hypervisor 23 of the CPU 22 receives the interrupt from the memory controller 24, the hypervisor 23 and MMU 29 read the physical address of the RAM 28 from the buffer 25 and perform the page migration to move the data from the physical address of the RAM 28 to the at least one n-channel region of the RAM 28, where m can be 4, and n can be 2 or 1. In some embodiments, the at least one n-channel region of the RAM 28 is within the at least one m-channel region of the RAM 28. In another embodiment, the at least one n-channel region of the RAM 28 is outside the at least one m-channel region of the RAM 28.

Figure 4:
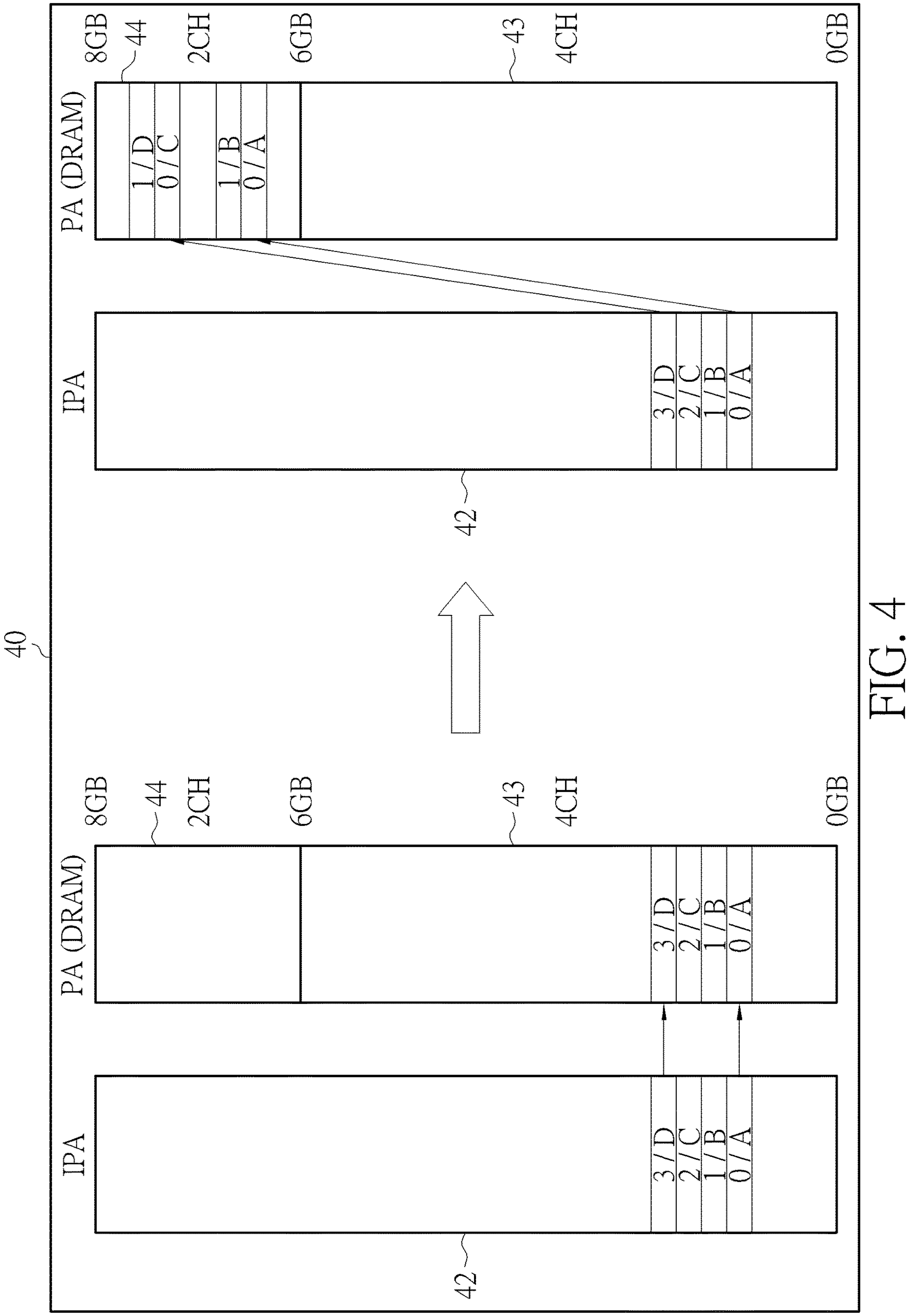
FIG. 4 is an implementation of switching from 4-channel DRAM to 2-channel DRAM according to an embodiment of the present invention.

FIG. 4 is an implementation 40 of switching from 4-channel DRAM 43 to 2-channel DRAM 44 according to an embodiment of the present invention. A mapping table in the MMU is shown as a memory region 42. In the 4-channel DRAM 43, the data A, B, C, and D is positioned at respective memory channels 0, 1, 2, 3. After the hypervisor 23 and MMU 29 of the CPU 22 finishes page migration from the 4-channel DRAM 43 to the 2-channel DRAM 44, the data A, B, C, D is positioned at respective memory channels 0, 1, 0, 1. Thus, the data A, B, C, D can be accessed from the 2-channel DRAM 44, resulting in a low power mode. However, this invention is not limited to switching from 4-channel DRAM to 2-channel DRAM, it can be used to switch from m-channel DRAM to n-channel DRAM, where m and n can be any integers, as long as m is greater than n.

Figure 5:
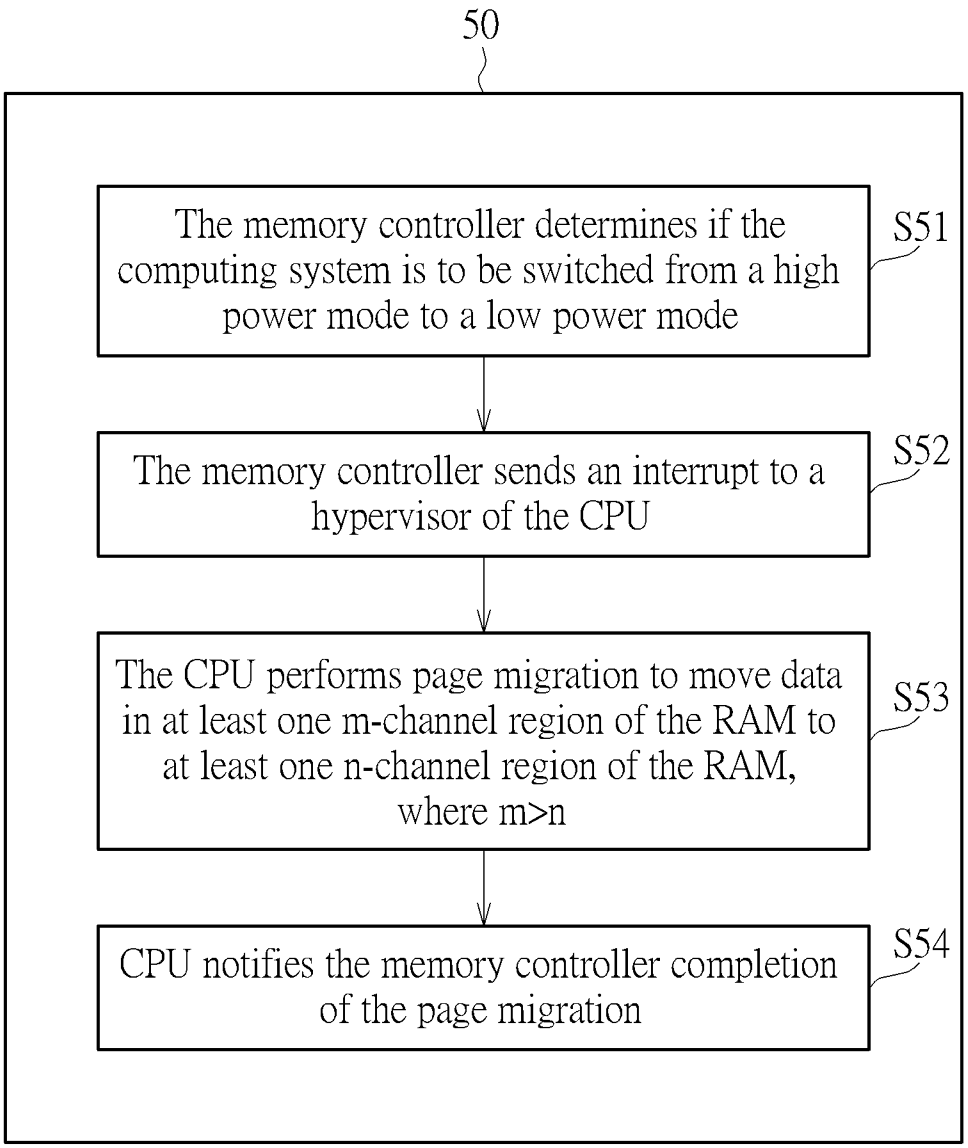
FIG. 5 is a method of switching from the at least one m-channel region of the DRAM to the at least one n-channel region of the DRAM according to an embodiment of the present invention.

FIG. 5 is a method 50 of switching from the at least one m-channel region of the RAM 28 to the at least one n-channel region of the RAM 28 according to an embodiment of the present invention.

Step 51: the memory controller 24 detects if the access event of the application is to be switched from a high performance mode to a low power mode;

Step 52: the memory controller 24 sends an interrupt to a hypervisor 23 of the CPU 22 if the buffer 25 is full or other power saving conditions are satisfied;

Step 53: the CPU 22 performs page migration to move data in the at least one m-channel region of the RAM 28 to the at least one n-channel region of the RAM 28, where m>n; and Step 54: the CPU 22 notifies the memory controller 24 completion of the page migration.

In this invention, the low power mode is implemented without changing any hardware. The at least one m-channel region is switched to the at least one n-channel region for reducing power, and most power is saved by using the at least one n-channel region. Whenever the low power mode is desirable, the hypervisor 23 and the MMU 29 of the CPU 22 can save power immediately without hardware changes by performing page migration. Thus, the problem of high power consumption in using DRAM is solved by this invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory control method for a computing system, the computing system comprising a memory controller, a central processing unit (CPU), a random access memory (RAM), and a buffer, the memory control method comprising:
- recording access data in the buffer;
- the memory controller determining that an access event of an application is to be switched from a high performance mode to a low power mode when the buffer is full and the low power mode is desirable;
- if the memory controller detects at least one m-channel region of the RAM has been accessed, the memory controller sending an interrupt to a hypervisor of the CPU;
- the CPU performing page migration to move data in the at least one m-channel region of the RAM to at least one n-channel region of the RAM, where m and n are positive integers, and m>n; and
- after completing the page migration, the CPU notifying the memory controller completion of the page migration.

2. The method of claim 1 wherein the RAM is a dynamic random access memory.

3. The method of claim 1 further comprising enabling the at least one m-channel region of the RAM.

4. The method of claim 1 further comprising the memory controller recording a physical address in the buffer.

5. The method of claim 1 wherein:
- the CPU performing the page migration to move the data in the at least one m-channel region of the RAM to the at least one n-channel region of the RAM is the CPU performing the page migration to move the data from a physical address of the RAM to the at least one n-channel region of the RAM.

6. The method of claim 1, wherein m is 4, and n is 2.

7. The method of claim 1, wherein:
- the CPU comprises a memory management unit (MMU); and
- the CPU performing the page migration to move the data in the at least one m-channel region of the RAM to the at least one n-channel region of the RAM is the MMU of the CPU performing the page migration to move the data from the at least one m-channel region of the RAM to the at least one n-channel region of the RAM.

8. The method of claim 1, wherein the at least one n-channel region is within the at least one m-channel region.

9. The method of claim 1, wherein the at least one n-channel region is outside the at least one m-channel region.

10. The method of claim 1, wherein the CPU performing the page migration is the hypervisor and a memory management unit of the CPU performing the page migration.

* * * * *